(12) United States Patent
Sugiyama (10) Patent No.: US 7,729,209 B2
(45) Date of Patent: Jun. 1, 2010

(54) RECORDING AND PLAYBACK APPARATUS USING HARDDRIVE FOR RIPPING DIGITAL AUDIO DATA

(75) Inventor: Tadashi Sugiyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 10/225,832

(22) Filed: Aug. 22, 2002

(65) Prior Publication Data

US 2003/0039178 A1 Feb. 27, 2003

(30) Foreign Application Priority Data

Aug. 22, 2001 (JP) .................. P2001-251545

(51) Int. Cl.
G11B 21/08 (2006.01)
(52) U.S. Cl. .................................. 369/30.23
(58) Field of Classification Search .............. 369/30.23, 369/7, 30.19, 30.05, 32.01, 30.24, 47.32–47.34; 707/104.1
See application file for complete search history.

(56) References Cited

U.S. PATENT DOCUMENTS

| 5,343,452 | A | * | 8/1994 | Maeda et al. ............ 369/30.25 |
| 5,717,671 | A |   | 2/1998 | Aramaki |
| 5,963,521 | A | * | 10/1999 | Nagashima et al. ....... 369/53.37 |
| 5,974,018 | A | * | 10/1999 | Takenaka ..................... 369/84 |
| 6,151,286 | A |   | 11/2000 | Inoue |
| 6,172,948 | B1 |  | 1/2001 | Keller et al. |
| 6,301,209 | B2 | * | 10/2001 | Fujinami ................. 369/47.15 |
| 6,388,959 | B1 | * | 5/2002 | Kondo ..................... 369/30.19 |
| 6,487,145 | B1 | * | 11/2002 | Berhan .................... 369/30.15 |
| 6,560,176 | B1 | * | 5/2003 | Heylen ...................... 369/53.1 |
| 6,560,577 | B1 | * | 5/2003 | Gilbert et al. .............. 704/500 |
| 6,587,404 | B1 | * | 7/2003 | Keller et al. ............. 369/30.06 |
| 6,674,692 | B1 | * | 1/2004 | Holland ........................ 369/7 |
| 6,693,857 | B1 | * | 2/2004 | Willis ..................... 369/30.23 |
| 7,050,368 | B2 | * | 5/2006 | Saito ...................... 369/47.12 |
| 7,145,741 | B2 | * | 12/2006 | Hirano et al. ................ 360/69 |
| 2001/0000540 | A1 |  | 4/2001 | O'Connor et al. |
| 2005/0141367 | A1 | * | 6/2005 | Morohashi .............. 369/47.12 |

FOREIGN PATENT DOCUMENTS

| EP | 0630021 | 12/1994 |
| EP | 1111614 | 6/2001 |
| JP | 10-334596 | 12/1998 |
| JP | 11-45556 | 2/1999 |
| JP | 11-086421 | 3/1999 |
| JP | 2001067100 | 3/2001 |
| WO | 9964969 | 12/1999 |
| WO | 0137438 | 5/2001 |

* cited by examiner

*Primary Examiner*—Tan X Dinh
(74) *Attorney, Agent, or Firm*—Pillsbury Winthrop Shaw Pittman LLP (57) ABSTRACT

Audio data which are read out from a compact disc drive are written into a hard disk drive (6) at a rate that is higher than an audio playback rate. The written audio data are read out at a rate which is higher than the audio playback rate, and than output to audio output interfaces (buffer memories). The audio output interfaces read out the audio data at the playback rate and output the data. Since the hard disk drive (6) can perform reading/writing at a rate which is sufficiently higher than the playback rate of audio data, monitoring is enabled while performing ripping.

2 Claims, 10 Drawing Sheets

RECORDING AND PLAYBACK APPARATUS USING HARDDRIVE FOR RIPPING DIGITAL AUDIO DATA

BACKGROUND OF THE INVENTION

The present invention relates to a digital audio recording and playback apparatus which extracts digital audio data from an audio compact disc to record the data, and plays back the digital audio data.

Today, a playback apparatus for playing back an audio compact disc is widely used, and even a processing apparatus such as a personal computer can play back an audio compact disc. In the field of a personal computer or the like, an apparatus having a so-called ripping function of extracting audio data of an audio compact disc and recording the data into a hard disk drive has been practically used.

When ripping is performed on an audio compact disc, it is often desired to monitor whether the audio data are correctly extracted or not. However, a conventional apparatus can perform only an operation of playing back data read out from an audio compact disc as they are, and cannot read cut data written into a hard disk drive and monitor the written stare.

The ripping is performed at a rate which is higher than the playback rate (44.1 kHz) of an audio compact disc. When ripped data are played back as they are, an expensive DAC which operates at the rate same as the high extraction rate (in the case of the quadruple speed, for example, 44.1×4=176.4 kHz) is required. Moreover, it is difficult to audibly check whether the audio data are correctly extracted or not, because the playback rate and the playback frequency are largely different from those for an actual audio signal.

SUMMARY OF THE INVENTION

It is an object of the invention to provide a digital audio recording and playback apparatus which can perform in parallel extraction (ripping) of data from an audio compact disc and monitoring of the data.

In order to solve the aforesaid object, the invention is characterized by having the following arrangement (1) A audio recording and playback apparatus comprising:
   a disc drive on which an audio compact disc storing audio data including at least one track is to be set;
   a storage unit having a storage capacity capable of storing all tracks of the audio data stored in the audio compact disc;
   a controller for reading out the audio data from the audio compact disc set on the disc drive, writing the read out audio data into the storage unit, and storing the audio data by the track into the storage unit; and
   an outputting unit for reading out the audio data written into the storage unit at a audio data playback rate and outputting the read out audio data in parallel with writing the audio data into the storage unit.

(2) The audio recording and playback apparatus according to (1), wherein the storage unit is a hard disk.

(3) A audio recording and playback apparatus comprising:
   a disc drive on to which a disc capable of writing data therein is to be set;
   an audio data input unit for inputting audio data;
   a storage unit;
   a recording instruction input unit for inputting an recording instruction; and
   a controller for starting writing the inputted audio data into the storage unit, reading out the audio data written in the storage unit, and writing the read out audio data into the disc set on the disc drive unit in response to the recording instruction inputted by the recording instruction input unit, thereby the inputted audio data is stored by the audio data input unit into both the storage unit and the disc.

(4) The audio recording and playback apparatus according to (3), wherein the storage unit is a hard disk.

(5) The audio recording and playback apparatus according to (3), wherein if the read out data include a silence signal lasting a predetermined time period, writing into the disc is performed while skipping the silence signal.

(6) The audio recording and playback apparatus according to (3), wherein the controller starts reading out the audio data written into the storage unit and writing the read out audio data into the disc set on the disc drive after a preparation for writing into a disc in the disc drive is completed.

(7) An audio playback apparatus comprising:
   a storage unit for storing audio data;
   a plurality of outputting units, each including a buffer memory capable of storing the audio data and outputting the audio data stored in the buffer memory;
   a controller for reading out the audio data stored in the storage unit at a rate higher than an audio playback rate, storing the read out audio data into each buffer memory, and outputting the audio data stored in each buffer memory from the corresponding outputting unit at the audio playback rate.

(8) The audio playback apparatus according to (7), wherein the storage unit is a hard disk.

(9) The audio playback apparatus according to (7), wherein the storage unit is a compact disc.

(10) The audio playback apparatus according to (7), wherein the audio data stored in each buffer memory are same each other or different each other.

(11) A method of recording and playback audio data stored in an audio compact disc storing audio data including at least one track, the method comprising the steps of:
   reading out the audio data from the audio compact disc;
   writing the read out audio data into a storage unit having a storage capacity capable of storing all tracks of the audio data stored in the audio compact disc; and
   reading out the audio data written into the storage unit at a audio data playback rate and outputting the read out audio data in parallel with writing the audio data into the storage unit.

(12) A method of recording an audio data, the method comprising the steps of:
   inputting the audio data;
   inputting an recording instruction; and
   starting writing the inputted audio data into a storage unit, reading out the audio data written into the storage unit, and writing the read out audio data into a disc capable of writing data therein in response to the inputted recording instruction, thereby the inputted audio data is stored Into both the storage unit and the disc.

(13) A method of outputting an audio data, the method comprising the steps of:
   reading out the audio data stored in a storage unit at a rate higher than an audio playback rate;

storing the read out audio data into each of a plurality of buffer memories, the plurality of buffer memories being installed in a plurality of outputting units, respectively; and outputting the audio data stored in each of the plurality of buffer memories from the corresponding outputting unit at the audio playback rate.

A usual compact disc drive can read data at a rate which is several times to several tens of times as high as the data rate (44.1 kHz) of the CD-DA standard that is a standard for an audio compact disc. When extraction (ripping) of audio data from an audio compact disc is performed at this rate, therefore, ripping can be efficiently performed in a short time period. Even when audio data which have been read out at the rate are monitored as they are, however, it is difficult to check whether the ripping is correctly performed or not, because the playback rate and the playback frequency are largely different from the original ones. In this state, moreover, it is impossible to check whether the writing is being correctly performed or not.

In the invention, therefore, ripping in which audio data that have been read out (at a high rate) from an audio compact disc set in the compact disc drive are written into the large capacity storage unit such as a hard disk drive is performed, and the written audio data are read out at the playback rate of the audio data and then played back. According to this configuration, while ripping is performed at a high rate, the audio data which have been extracted and written can be monitored at a playback rate and a playback frequency that are usually employed. Therefore, it is possible to surely check whether the ripping is being correctly performed or not.

In this case, when a track which is currently undergone the ripping is played back only for the ripping time period, leading portions of all tracks to be ripped can be checked at the same time period as that for the ripping. When ripped audio data are sequentially played back, all the track can be checked while performing playback, in parallel with the ripping.

In the invention, when audio data which are received from the outside are to be written on a writable disc medium such as a CD-R, the audio data are once stored in the storing means such as a hard disk drive. According to this configuration, when a recording operation is instructed at a timing when recording is to be started and without consideration of the OPC time or the like at the start of writing on the disc medium, audio data which are input after the timing can be written onto the disc medium without omission.

In the case where input audio data include a long silence interval or the like, the audio data can be written onto the disc medium with previously editing the data, so that writing without waste is enabled.

In the invention, the fact that the reading rate of large capacity storing means such as a hard disk drive is higher than the playback rate of audio data is used, so that separate audio data are supplied in parallel from one large capacity storing means to plural audio outputting means, respectively. According to this configuration, a special operation such as simultaneous playback in two rooms can be performed by using single large capacity storing means.

DETAILED DESCRIPTION OF PREFERRED EMBODIMENTS

Figure 1:
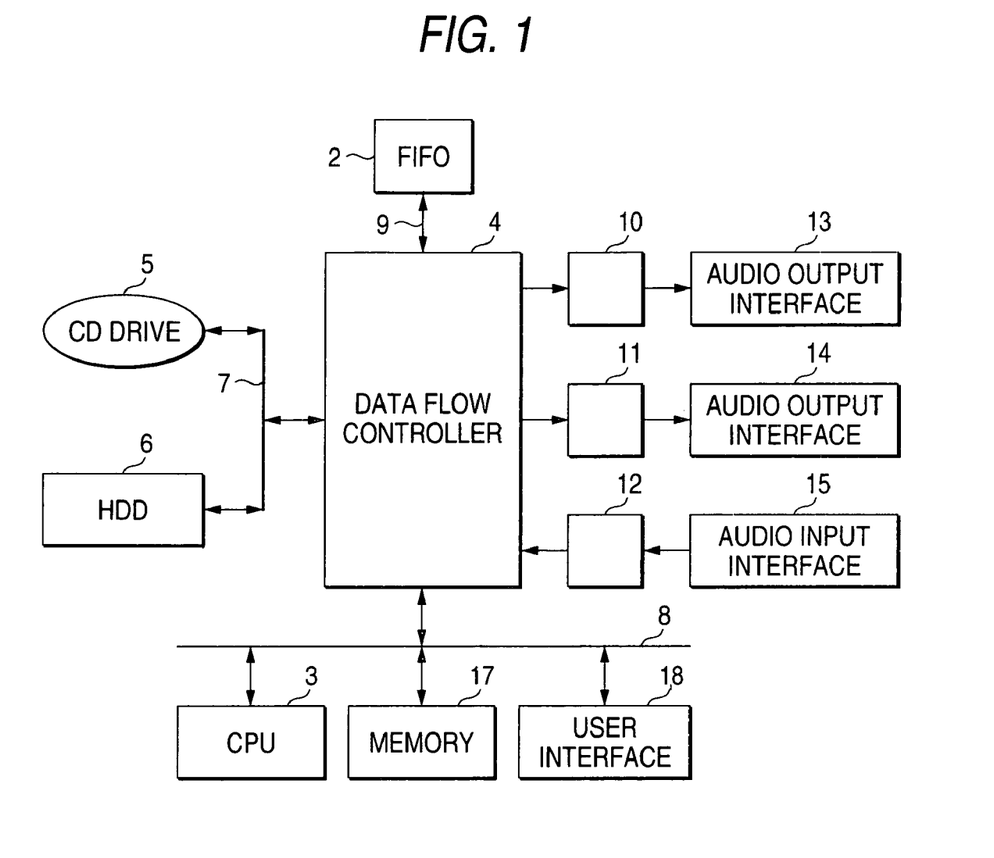
FIG. 1 is a block diagram of a digital audio recording and playback apparatus which is an embodiment of the invention.

A digital audio recording and playback apparatus according to an embodiment of the invention will be described with reference to the accompanying drawings. FIG. 1 is a block diagram of the digital audio recording and playback apparatus. A compact disc drive 5 and a hard disk drive 6 are connected to a data flow controller 4 via an IDE bus 7, and a CPU 3 is connected thereto via a CPU bus 8; and a FIFO 2 is connected thereto via a data bus 9. Audio output interfaces 13 and 14, and an audio input interface 15 are connected to the data flow controller 4 via respective buffer memories 10, 11, and 12. The hard disk drive 6 is a magnetic storage medium. The audio interfaces 13, 14, and 15 may be digital interfaces or analog interfaces. In the case of analog interfaces, the interfaces incorporate a DAC or an ADC.

The hard disk drive 6 has a capacity (for example, about 10 GB) which can store data of several audio compact discs, and its writing and reading rates are sufficiently higher than the reading rate (writing rate) of the compact disc drive. The compact disc drive 5 may be either of a CD-ROM drive, a CD-R drive-, or a CD-RW drive, and its reading rate is about 10 to 40 times the playback data rate of an audio compact disc. In the case where a CD-R drive is used as the compact disc drive 5, the writing rate is about 4 to 12 times the playback data rate of an audio compact disc.

The data flow controller 4 is constituted by processing apparatuses such as a DSP, and plays back an audio compact disc (hereinafter, referred to merely as compact disc) set in the compact disc drive 5, in accordance with instruction 5 from the CPU 3 and extracts audio data of the compact disc to write the data into the hard disk drive 6 (ripping) During the ripping operation, the audio data written into the hard disk drive are read out and played back, so that it is possible to monitor whether the audio data are correctly written or not As described above, the reading and writing rates of the hard disk drive 6 are sufficiently higher than the reading rate of the compact disc drive 5, that is, sufficiently higher than the playback rate of the compact disc. Therefore, the writing of the ripping, and the monitoring (playback) thereof can be processed in parallel.

Since the reading and writing rates of the hard disk drive 6 are sufficiently higher than the playback rate of audio data and the writing rate of the compact disc drive 5, audio data which are input from the outside (the audio input interface 15) can be once buffered in the hard disk drive 6, and then written onto the disc medium (CD-R) set in the compact disc drive 5 while being delayed and edited.

The audio data recorded in the hard disk drive 6 can be separately output to the two audio output interfaces 13 and 14 in parallel. This can be implemented by writing separate audio data into the buffer memories 10 and 11 at a high rate, and causing the audio output interfaces 13 and 14 to read out the audio data written into the buffer memories 10 and 11, at the playback rate.

The FIFO 2 is used as a buffer for the data transfer from the compact disc drive 5 to the hard disk drive 6, or that from the hard disk drive 6 to the compact disc drive 5.

In addition to the CPU 3 and the data flow controller 4, also a memory 17 and a user interface 18 are connected to the CPU bus 8. The user interface 18 includes an operating device for setting the operation mode and for selecting the number (music piece number) of a track to be played back or ripped, an operating device for instructing start/stop of recording and playback, etc. The user interface includes also a display device on which information such as the number or a track that is currently played back or ripped is to be displayed. In the embodiment, terms "track" and "music piece" correspond to each other, and are used as synonyms.

In the apparatus, various modes can be set as the operation mode. Hereinafter, five of the modes will be described. The user selects the operation mode by using the user interface 18.

(1) Playback mode: a mode in which audio data recorded on a compact disc set in the compact disc drive 5, or the hard disk drive 6 are played back.

(2) Multi-playback mode: a mode in which separate audio data are output from the hard disk drive 6 or a compact disc set in the compact disc drive 5 to the two audio output interfaces 13 and 14 to be played back, respectively (simultaneous playback in two rooms). In both the hard disk drive and the compact disc drive 5, data can be read out at a rate which is sufficiently higher than the playback rate of audio data. Therefore, multi-playback is realized by alternately reading out plural sets of audio data, writing the sets of audio data into the buffer memories 10 and 11, and causing the audio output interfaces 13 and 14 to read out the sets of audio data at the audio playback rate.

(3) Extraction monitor mode: a mode in which audio data are extracted (ripped) from a compact disc set in the compact disc drive 5 and then recorded into the hard disk drive 6, and, during a period when audio data of tracks are extracted, the audio data recorded in the hard disk drive 6 are read out and then output as an audio signal from the audio output interface 13 or 14, thereby enabling the user to check whether the writing into the hard disk drive 6 is being correctly performed or not. In extraction of audio data, usually, data of all tracks are extracted and recorded in the sequence of the tracks. Alternatively, the user may select tracks, and only audio data of the selected tracks may be extracted. Since the data extraction is performed at a rate which is higher than the playback rate, the section which can be played back during the period is a part of the leading portion of a music piece.

(4) Extraction playback mode: a mode in which audio data are extracted (ripped) from a compact disc set in the compact disc drive 5 and then recorded into the hard disk drive 6, and the audio data recorded in the hard disk drive 6 are sequentially played back (output to the audio output interface 13 or 14). In the mode, the user can check whether the writing into the hard disk drive 6 is being correctly performed or not. Since all of the ripped audio data (the audio data written into the hard disk drive 6) are sequentially played back, the user can use this mode for playing back a compact disc.

(5) External compact disc record mode: a mode in which audio data input through the audio input interface 15 are recorded on a disc medium such as a CD-R set in the compact disc drive 5. The audio data which are input through the audio input interface 15 are once buffered in the hard disk drive 6 to be delayed until preparation of the compact disc drive 5 is completed. When the input audio data include a silence interval (blank) that is longer than a predetermined time period (for example, 20 seconds), the audio data are supplied to the compact disc drive 5 while the interval is cut off or skipped.

Hereinafter, (3) extraction monitor mode, (4) extraction playback mode, (5) external compact disc record mode, and (2) multi-playback mode will be described in detail.

Figure 2:
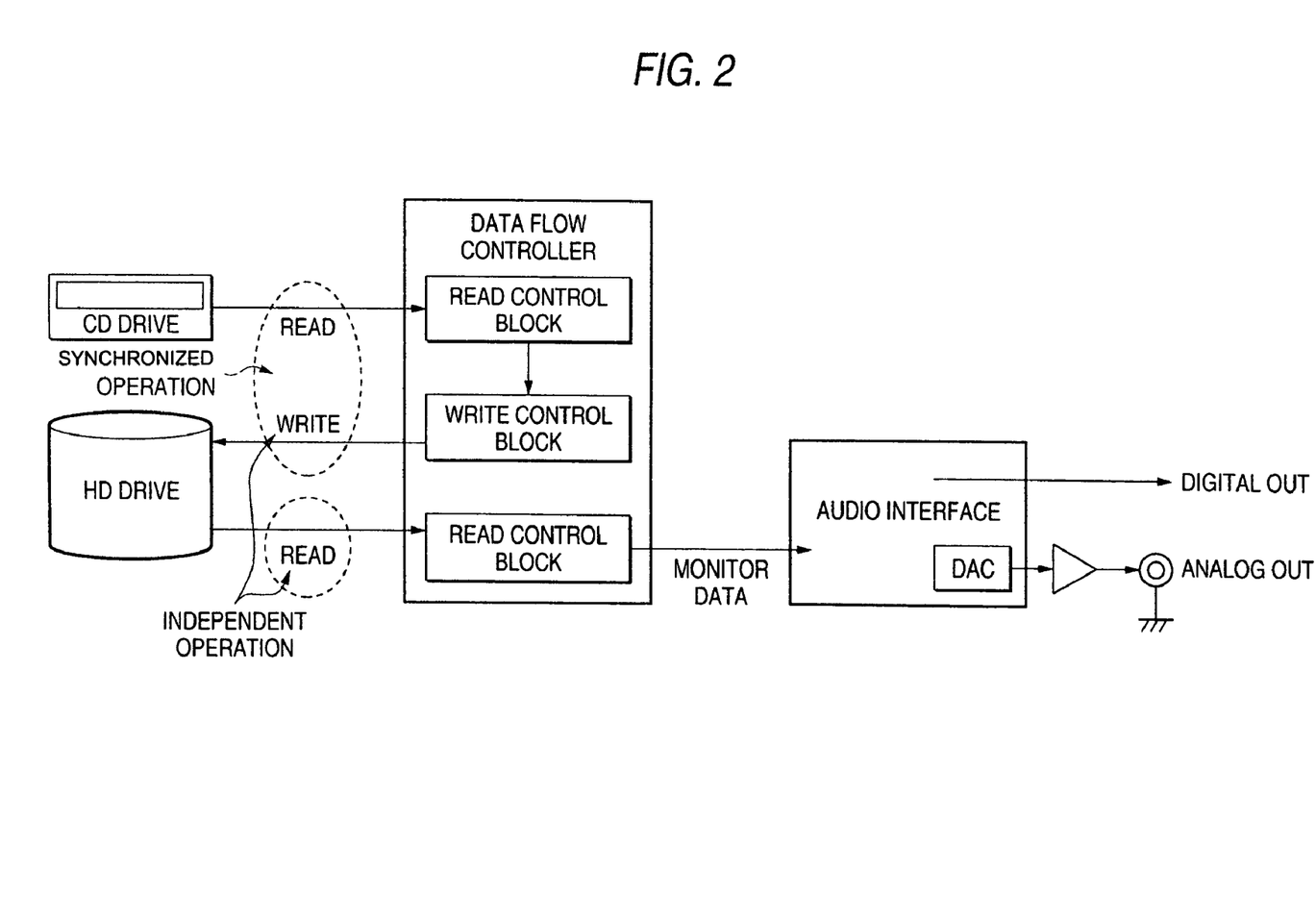
FIG. 2 is a diagram showing the signal flow in an extraction monitor mode of the digital audio recording and playback apparatus.

FIGS. 2 to 5 are diagrams illustrating the extraction monitor mode. FIG. 2 is a diagram showing the signal flow in the extraction monitor mode. The data flow controller 4 internally comprises functional blocks, i.e., a read control block for the compact disc drive 5 to read out audio data from the compact disc drive 5, a write control block to write the audio data into the hard disk drive 6 and a read control block for the hard disk drive 6 to read out the audio data written into the hard disk drive 6 and output the audio data to the audio output interfaces. In this case, the reading (Read) from the compact disc drive 5, and the writing (Write) into the hard disk drive 6, i.e., the operations of ripping must be synchronized with each other, and the reading (playback) from the hard disk drive 6 is performed at a rate which is independent from the rates of Read and Write. However, the playback time period is restricted so as to be equal to the ripping time period.

Figure 3:
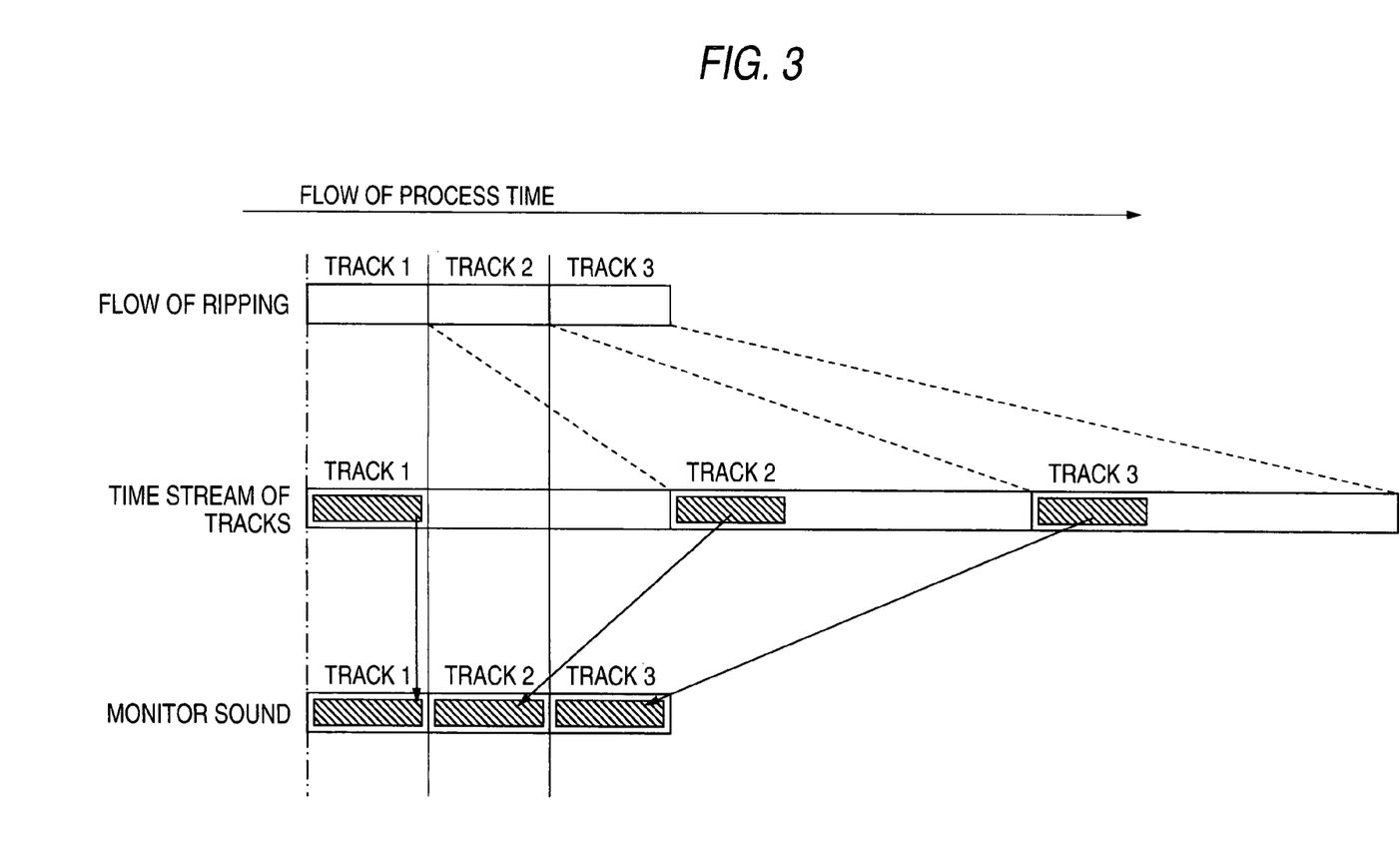
FIG. 3 is a diagram illustrating the flow of the process time in the extraction monitor mode of the digital audio recording and playback apparatus.

FIG. 3 is a diagram illustrating the flow of the process time in the extraction monitor mode. The figure shows the case where ripping of audio data of three tracks is performed. The middle stage of the figure shows the time streams of the tracks, where each time stream defines a period of actual time needs for playback of each track. Since both the compact disc drive 5 and the hard disk drive 6 perform reading and writing at a high speed, ripping is performed on the tracks for the time periods shown in the upper stage of the figure. In the extraction monitor mode, during a period when ripping is performed on each of the tracks, ripped data of the track is readout and played back. As shown in the middle and lower stages of the figure, the playback monitor sound corresponds only to part of section of the leading portions. This is because playback is performed at the audio playback rate which is lower than the rate of the ripping. In the intermission of ripping, the data flow controller 4 writes audio data into the buffer memory 10 or 11 so as to prevent underrun and overflow at the audio playback rate.

Figure 4:
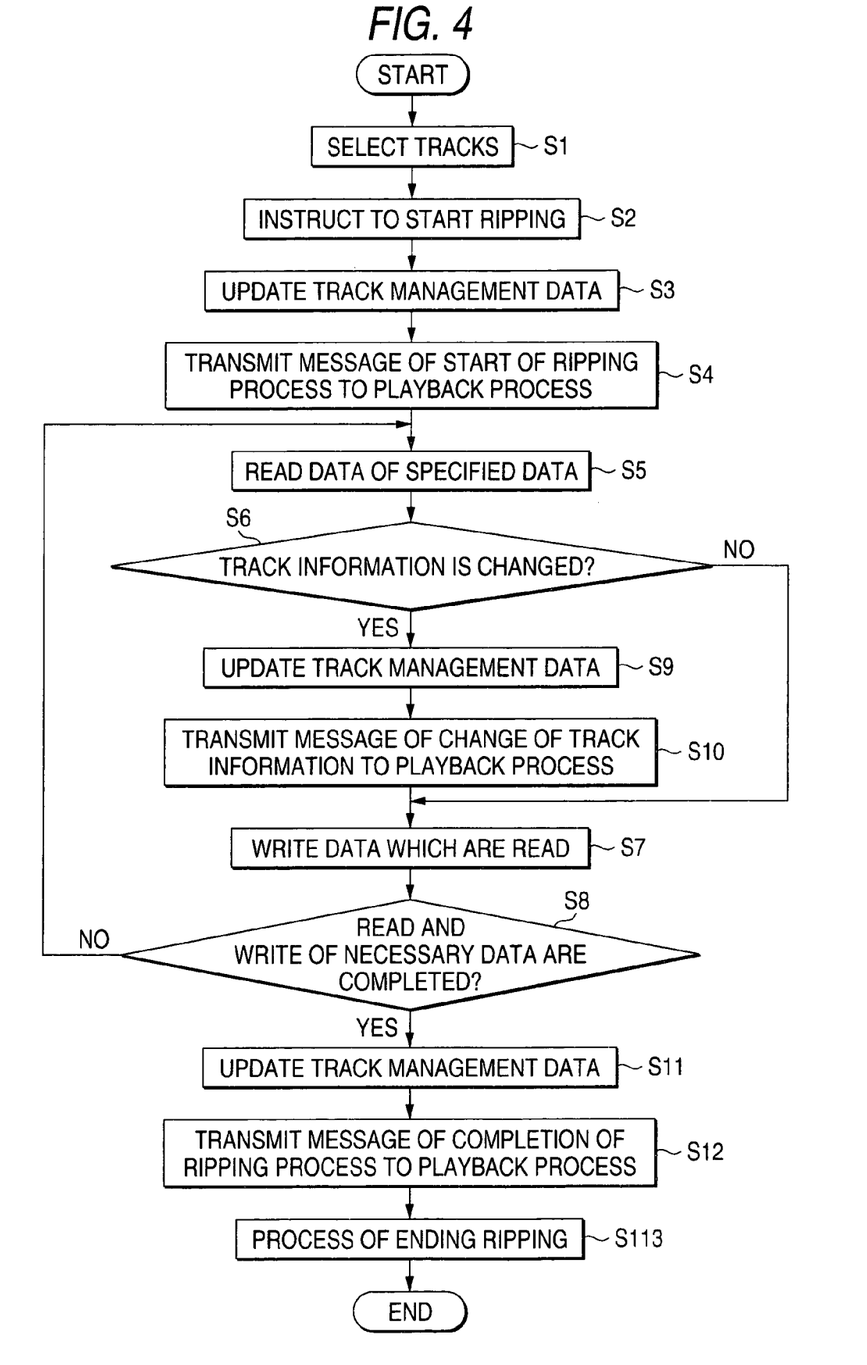
FIG. 4 is a flowchart showing the operation of the extraction monitor mode of the digital audio recording and playback apparatus.
Figure 5:
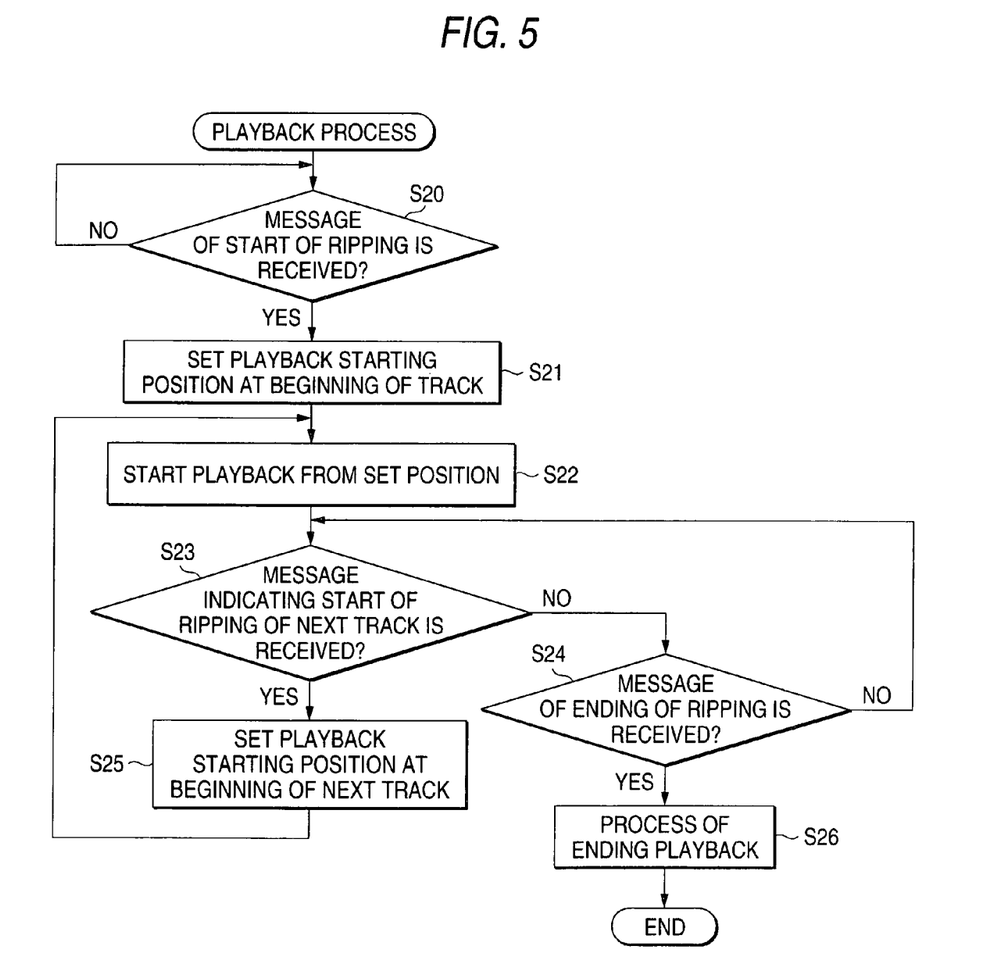
FIG. 5 is a flowchart showing the operation of the extraction monitor mode of the digital audio recording and playback apparatus.

FIGS. 4 and 5 show the flow of the operation of a control section (the CPU 3 and the data flow controller 4) in this mode. FIG. 4 is a flowchart showing the operation of the ripping process, and FIG. 5 is a flowchart showing the operation of the monitor process.

Referring to FIG. 4, first, the user selects tracks to be ripped from the compact disc set in the compact disc drive 5 (s1). When the track selection is not particularly conducted, all tracks are selected by default. When the user instructs the start of the ripping process (s2), the initial track number is written into track management data for managing tracks which are currently ripped (s3), and a message indicating that the ripping process is started is transmitted to the monitor process (playback process) (s4). As a result, the operation of the monitor process is started.

Thereafter, data of a specified size which are to be written into the hard disk drive 6 are read from the compact disc drive 5 (s5), and it is judged based on the subcode information of the data whether the track information is changed or not (s6). If the track information is not changed, the data are written into the hard disk drive as they are (only with performing isolation of the subcode information) (s7). By contrast, if the track information is changed, the track management data are updated to the new track information (s9), a message indicating of this is transmitted to the monitor process (s10), and the read data are then written into the hard disk drive 6 (s7). In response to the message of s10, the monitor process switches over the track to be played back.

When the above process is performed on all of the selected tracks (s8) and ripping of all the tracks is ended, the track management data are updated (s11), a message indicating that ripping is ended is transmitted to the monitor process (s12), and the ripping process is ended (s13). In response to the message indicating that ripping is ended, the monitor process is ended.

FIG. 5 is a flowchart showing the operation of the monitor process. The monitor process is started when the message indicating that the ripping process is started (see s4 of FIG. 4) is transmitted from the ripping process of FIG. 4 (s20). When the monitor process is started, the position of the beginning of the audio data (track) which are ripped and written at this time into the hard disk drive 6 is set as the playback starting position (s21). Then, playback is started from the position (s22). The playback of the track is continued until the message indicating that ripping is transferred to the next track (see s10 of FIG. 4) is received (s23). When the message indicating that ripping is transferred to the next track is received, the playback position is set to the position of the beginning of the track (s25), and playback is restarted from the position (s22).

The process is continued until ripping of all the tracks is completed. When the message indicating that the ripping process is completed (see s12 of FIG. 4) is transmitted from the ripping process of FIG. 4 (s24, see s12 of FIG. 4), the monitor process is ended (s26).

As a result of the above operations, during a period such as shown in FIG. 3 when ripping is performed on each of the tracks, it is possible to monitor the leading portion of the ripped data of the track.

Figure 6:
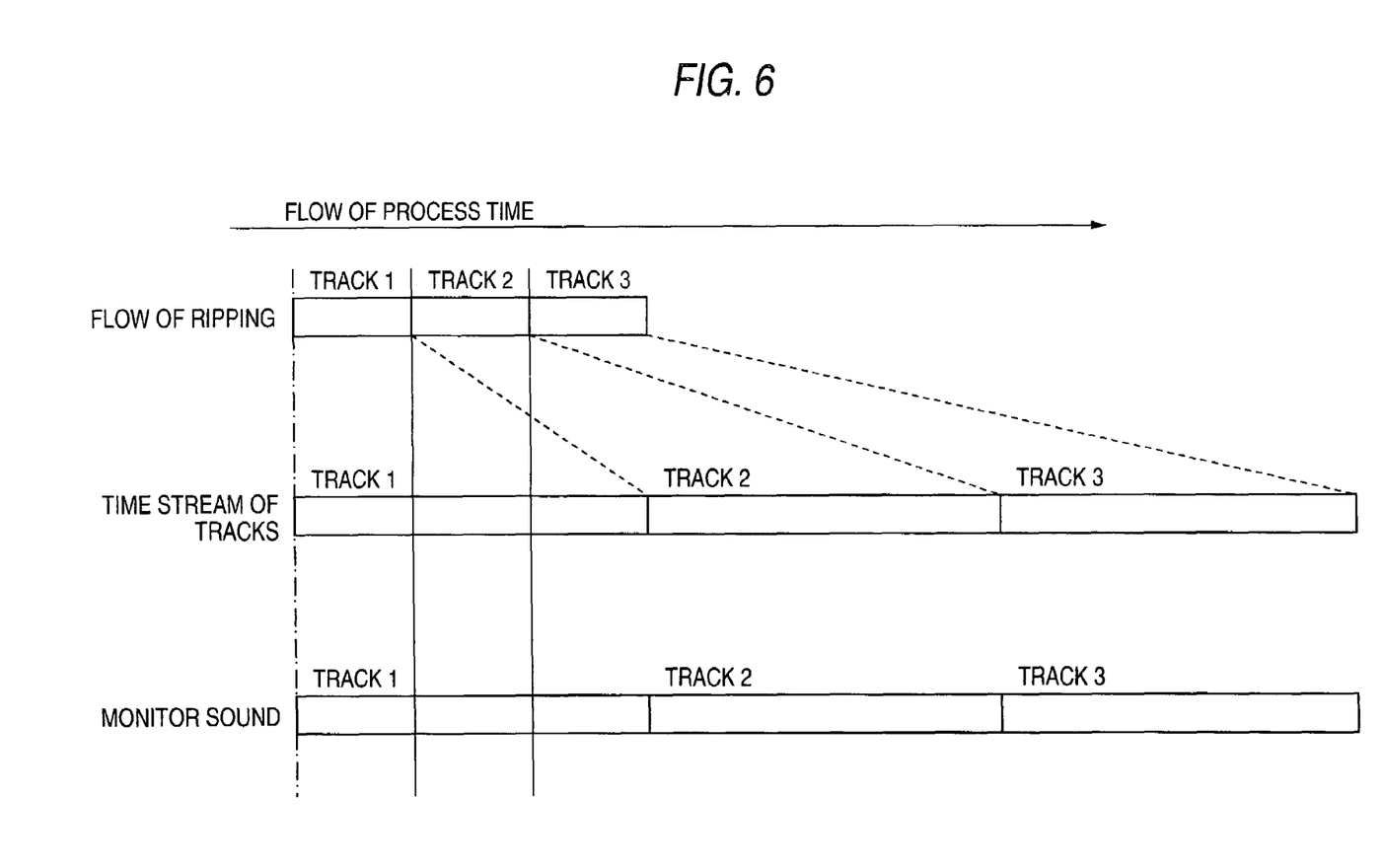
FIG. 6 is a diagram illustrating the flow of the process time in an extraction playback mode of the digital audio recording and playback apparatus.
Figure 7:
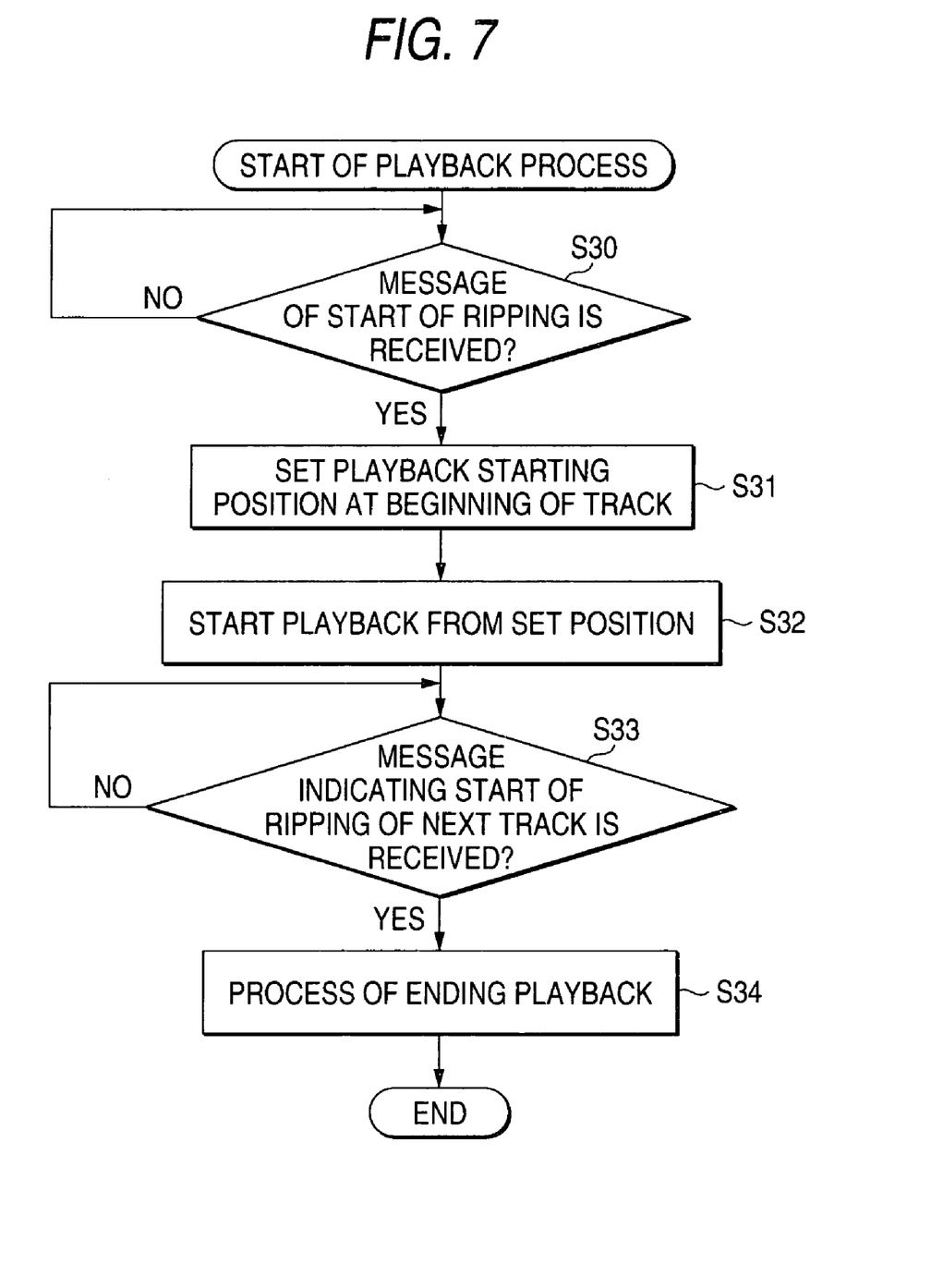
FIG. 7 is a flowchart showing the operation of the extraction playback mode of the digital audio recording and playback apparatus.

FIGS. 6 and 7 are diagrams illustrating the extraction playback mode. The signal flow in the extraction playback mode is identical with that of the above-described extraction monitor mode (see FIG. 2). The data flow controller 4 reads out audio data from the compact disc drive 5, writes the audio data into the hard disk drive 6, and reads out the audio data written into the hard disk drive 6 to output the data to the audio output interfaces. The playback is performed sequentially on all the audio data which are extracted and written into the hard disk drive 6 in this ripping process Therefore, the user can listen to the data with sensation similar to that in the case of the playback made.

FIG. 6 is a diagram illustrating the flow of the process time in the extraction playback mode. The figure shows the case where ripping of audio data of three tracks is performed. The middle stage of the figure shows the time streams of the tracks. Since both the compact disc drive 5 and the hard disk drive 6 perform reading and writing at a high speed, ripping is performed on the tracks for the time periods shown in the upper stage of the figure. In the extraction playback mode, ripped tracks are played back. However, playback is performed on all audio data of each of the tracks independently of a track which is being ripped. As shown in the lower stage, therefore, the monitor sound coincides with the time streams of the tracks.

FIG. 7 is a flowchart showing the operation of the playback process in the extraction playback mode. The ripping process may be identical with the ripping process (FIG. 4) in the extraction monitor mode. When the message indicating that ripping is started is transmitted from the ripping process, the playback is started (s30). Initially, the position of the beginning of the audio data which are ripped and written at this time into the hard disk drive is set as the playback starting position (s31). Then, playback is started from the position (s32). Thereafter, audio data are sequentially played back irrespective of the progress of the ripping process. If playback of all the tracks is ended (s33), the playback process is ended (s34). When attention is focused only on the playback process, the playback process is identical with a usual playback operation. Therefore, control operations such as stop and pause may be made active in the same manner as the usual playback operation.

Figure 8:
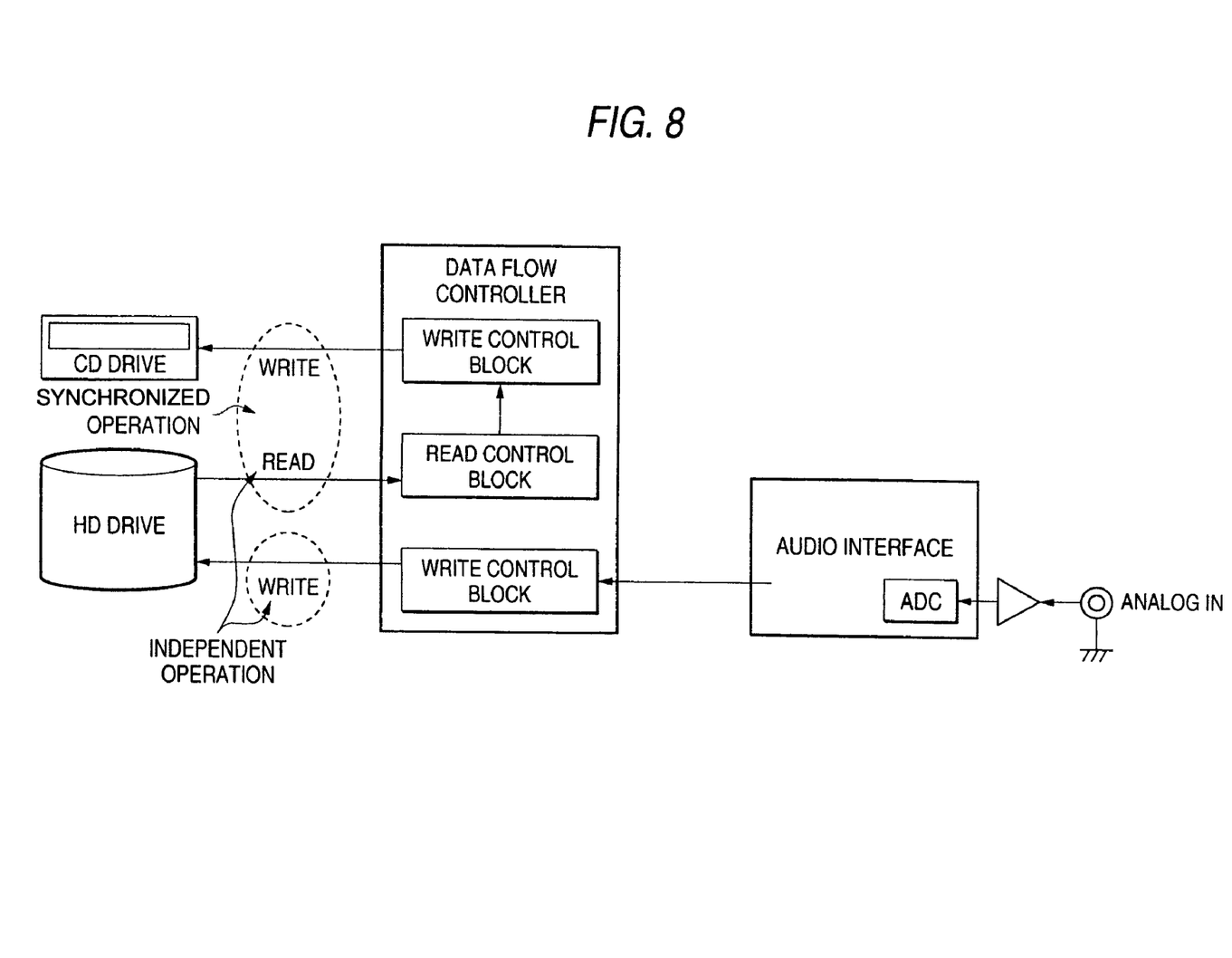
FIG. 8 is a diagram illustrating the signal flow in an external compact disc record mode of the digital audio recording and playback apparatus.
Figures 9A, 9B:
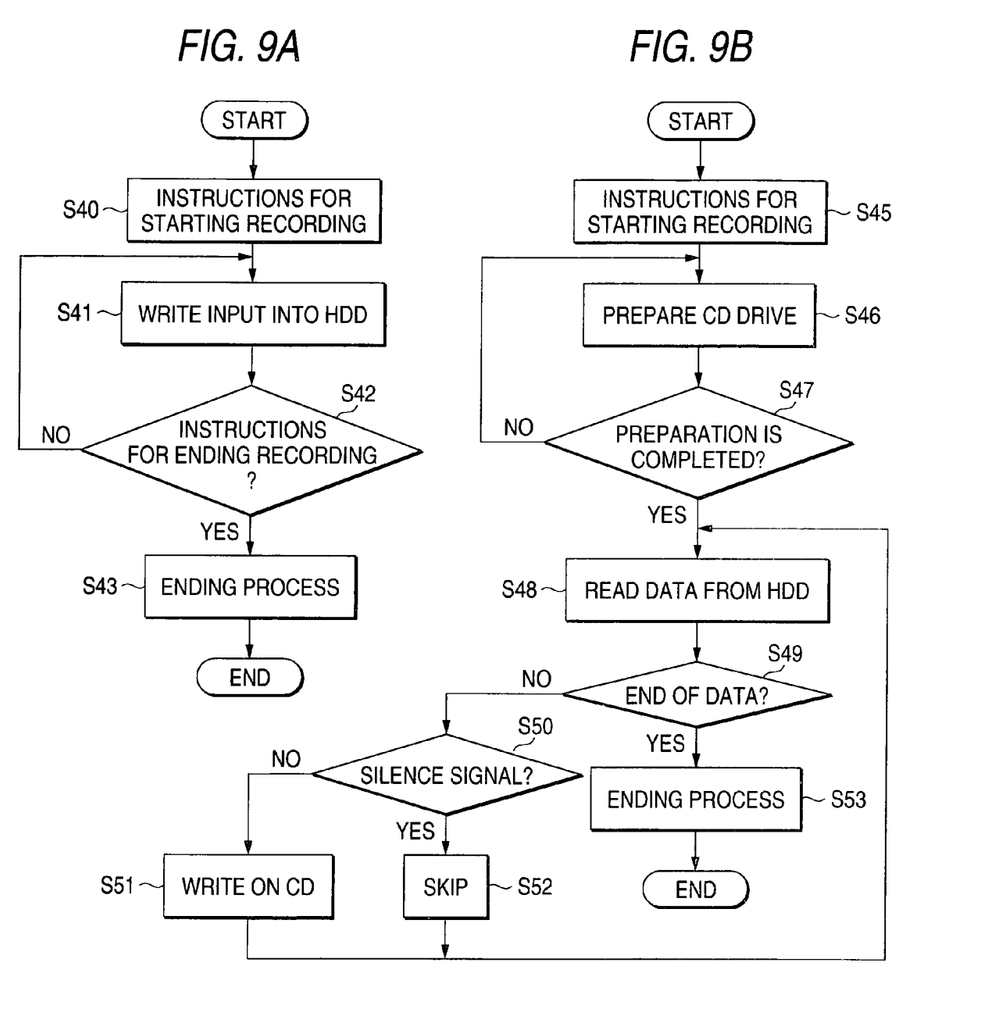
FIGS. 9A and 9B are flowcharts showing the operation of the external compact disc record mode of the digital audio recording and playback apparatus.

FIGS. 8 and 9 are diagrams illustrating the external compact disc record mode. In the external compact disc record mode, audio data input through the audio input interface 15 are recorded on a disc medium such as a CD-R set in the compact disc drive 5. FIG. 8 is a diagram showing the signal flow in the external compact disc record mode. The data flow controller 4 internally comprises functional blocks, i.e., a write control block for the compact disc drive 5, and a write control block and the read control block for the hard disk drive 6. The data flow controller writes audio data, which is inputted through the audio input interface 15, into the hard disk drive 6, delays the audio data by a given time period, performs a predetermined process on the audio data, and then writes the audio data onto a compact disc medium set in the compact disc drive 5.

FIGS. 9A and 9B are flowcharts showing the operation of the external compact disc record mode. FIG. 9A shows a buffer process, and FIG. 9B shows a writing operation on a compact disc. Referring to FIG. 9A, when the user gives instructions for starting the recording operation (s40), the audio data input through the audio input interface 15 are written into a predetermined area of the hard disk drive 6 (s41). The operation of writing input data is continued until the user gives instructions for stopping the recording.

Referring to FIG. 9B, when the User gives instructions for starting the recording operation (s45: identical with s40), a process of setting up the compact disc drive 5 is performed (s46). The process includes, for example, the OPC (Optimum Power Control) process, and usually requires a time period of several seconds. When the process is ended, the control waits until preparation for writing-audio data is completed (s47).

When preparation for writing audio data is completed, the audio data are sequentially read out from the predetermined area of the hard disk drive 6 (s48), and the audio data are then written onto the disc medium (s51). If the read out data include a silence signal lasting a predetermined time period or longer (s50), the data writing is performed while skipping the silence signal (s52). When writing of the audio data buffered in the hard disk drive 6 is ended (s49), a writing ending process is executed (s53) to terminate the operation.

The time period when the silence signal lasts can be known by reading ahead data. The buffered data may not be written into the hard disk drive 6 as they are, but may be written thereinto after being subjected to a filter process of a long time or the like by using the data buffering.

Figure 10:
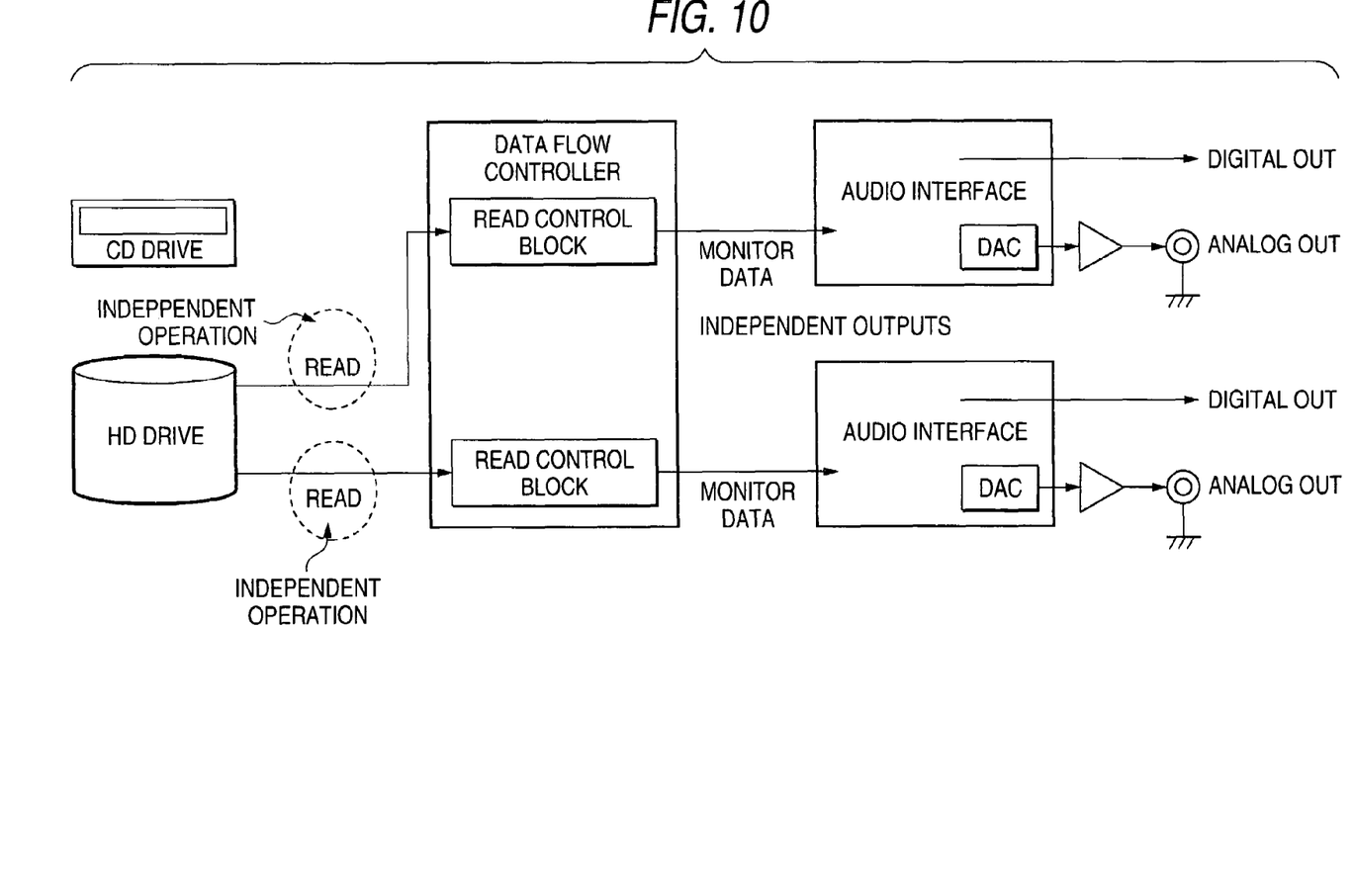
FIG. 10 is a diagram illustrating the signal flow in a multi-playback mode of the digital audio recording and playback apparatus.

FIG. 10 is a diagram showing the signal flow in the multi-playback mode. In the mode, separate audio data are output from the hard disk drive 6 or a compact disc set in the compact disc drive 5 to the two audio output interfaces 13 and 14 to be played back. An example in which Separate audio data are output from the hard disk drive 6 to the two audio output interfaces 13 and 14 will be described.

Two read control blocks for the hard disk drive 6 are set in the data flow controller 4. In accordance with independent instructions from the CPU 3, the read control blocks read out separate audio data (which may be the same, but are not requested to be identical with each other), and then output the audio data to the buffer memories 10 and 11 of the audio output interfaces 13 and 14. The reading and writing are performed at a rate which is higher than the audio playback rate, and while checking the size of the free space in the buffer memories 10 and 11. The audio output interfaces 13 and 14 read out data of the buffer memories 10 and 11 at the audio playback rate, and outputs the data. In the case of digital audio interfaces, the data are output as they are, and, in the case of analog audio interfaces, the data are converted into analog signals by the DAC and then output.

In the embodiment, the digital audio data conceptually include a stream signal of the CD-DA format, a WAV file, and the like, and are adequately converted into a suitable format in accordance with the storage means and the transmission path.

The digital audio recording and playback apparatus according to the embodiment may be a dedicated audio apparatus or may be realized by a personal computer and software. The number of the audio output interfaces (audio outputting unit) is not limited to two, and a larger number of audio output interfaces may be used.

As described-above, according to the invention, in parallel with ripping of a compact disc, audio data which are written by the ripping into large capacity storing means such as a hard disk drive can be monitored. Therefore, it is possible to check whether the ripping is correctly performed or not.

According to the invention, audio data are buffered in storing means such as a hard disk drive and then written onto a disc medium such as a CD-R. When instructions for recording is given, therefore, recording can be immediately started even before preparation for writing onto the disc medium is completed.

According to the invention, audio data can be output separately independently to plural audio outputting means, and hence audio playback functions of plural apparatuses can be realized by a single apparatus.

What is claimed is:

1. An audio recording and playback apparatus comprising:
    a disc drive, on which an audio compact disc storing audio data including a plurality of tracks, is to be set;
    a storage unit having a storage capacity capable of storing all tracks of the audio data stored in the audio compact disc;
    a controller for reading out a track of the audio data from the audio compact disc set on the disc drive, writing the read out track of the audio data into the storage unit and reading out only a part of the track of the audio data from the storage unit at an audio data playback rate in parallel with writing the track of the audio data into the storage unit to monitor that the writing into the storage unit is being correctly performed so that a user can verify whether a ripping process is being correctly performed; and
    an outputting unit for outputting the part of the track of the audio data read out from the storage unit,
    wherein, when the ripping process of the controller finishes reading out of the track of the audio data from the audio compact disc and writing the track of the audio data to the storage unit, begins to read out a next track of audio data from the audio compact disc, writes the next track of audio data into the storage unit, and sends a message to a monitoring process, without user interaction, identifying reading out of the next track of audio data has begun, and the monitoring process of the controller stops reading out the part of the track of the audio data from the storage unit after receiving the message identifying reading out of the next track from the audio compact disc has begun, starts reading out part of the next track from the storage unit and transfers the part of the next track of the audio data to the outputting unit for playback so that a user can verify the ripping process on the next track of the audio data is being correctly performed.

2. A method of recording and playback of audio data stored in an audio compact disk storing audio data including at least one track, the method comprising:
    reading out a track of the audio data from the audio compact disc;
    writing the read out track of audio data into a storage unit having a storage capacity of storing all tracks of the audio data stored in the audio compact disc;
    reading out only a part of the track of the audio data from the storage unit at an audio data playback rate in parallel with writing the track of the audio data into the storage unit to monitor that the writing into the storage unit drive of the track of audio data is being correctly performed;
    outputting the audio data to audio output interfaces,
    starting reading out a next track of the audio data from the audio compact disc and writing the read out next track of audio data into the storage unit;
    generating, at a ripping process, a message identifying that the ripping process is complete on the track of the audio and has transferred to the next track of the audio data;
    sending the message identifying that the ripping process is complete on the track of the audio data to a monitoring process without user interaction;
    receiving, at the monitoring process, the message identifying that the ripping process has transferred to the next track to the next track of the audio data;
    stopping reading out the part of audio data of the track from the storage unit after receiving the message identifying the ripping process has transferred to the next track of the audio data;
    starting reading out a part of the next track from the storage unit at the audio data playback rate; and
    outputting the part of the audio data of the next track read out from the storage unit to audio output interfaces so that a user can check whether or not the ripping process is being correctly performed.

* * * * *